March 2, 1937.  L. P. ROODE  2,072,772
LAWN MOWER SHARPENER
Filed Oct. 10, 1935
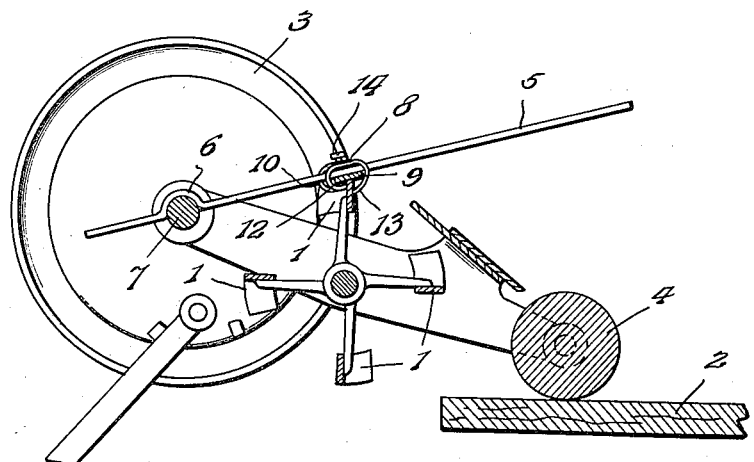
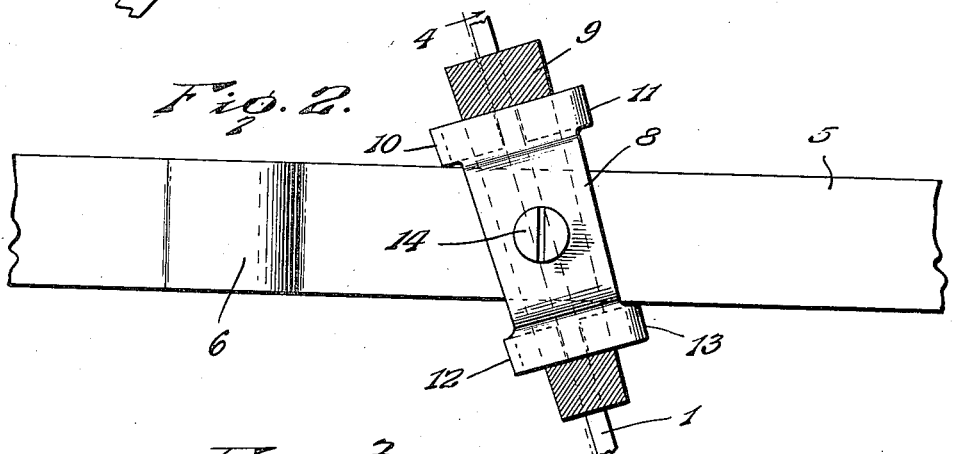
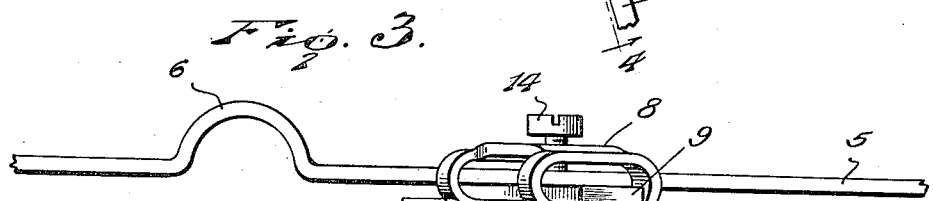
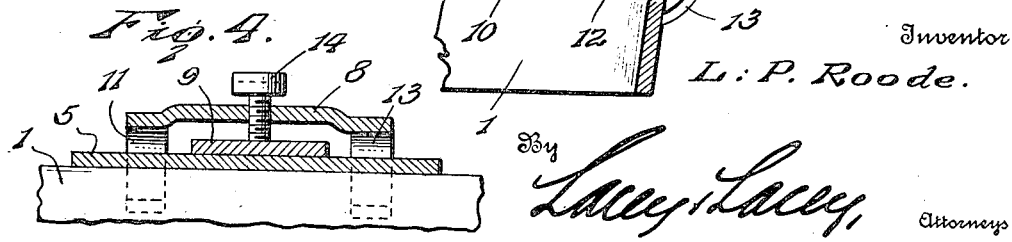
Inventor
L. P. Roode.
By Lacey & Lacey,
Attorneys Patented Mar. 2, 1937

2,072,772

UNITED STATES PATENT OFFICE 2,072,772

LAWN MOWER SHARPENER

Lewis P. Roode, Gallup, N. Mex.

Application October 10, 1935, Serial No. 44,441

2 Claims. (Cl. 76—82.1)

This invention relates to a sharpening device particularly adapted for sharpening the blades of the rotary cutter of a lawn mower but it is to be understood that its use is not restricted to a lawn mower as it may be employed for sharpening the blades of any rotary cutter.

One object of the invention is to provide a sharpener of such construction that it may be mounted for reciprocating movement longitudinally of the rotary cutter of the lawn mower with a file forming part of the sharpener engaged with the blade of the cutter so that as the device is reciprocated the blade will be filed and a sharp cutting edge provided.

Another object of the invention is to provide a device of this character wherein the file is adjustably mounted so that it may be secured in such angular relation to the operating bar that it will have correct contacting engagement with an edge face of a blade to be sharpened.

Another object of the invention is to not only permit the file to be angularly adjusted but also shifted along the operating bar of the device and thus disposed in correct position to engage a blade of either a large or small lawn mower.

Another object of the invention is to provide the device with file engaging cleats or fingers so constructed that they will not only hold the file in place but also engage a blade of a lawn mower from opposite faces thereof and impart rotary movement to the cutter about its axle as the file moves along the blade. Therefore, a spirally extending blade will have portions moved into correct relation to the file during a sharpening operation.

Another object of the invention is to provide a device of this character which is very simple in construction and easy to operate.

The invention is illustrated in the accompanying drawing, wherein:

Figure 1 is a view showing a portion of a lawn mower of conventional construction in section, with the improved sharpener applied thereto.

Figure 2 is a top plan view of the shapener.

Figure 3 is a view showing the sharpener in side elevation and in operative engagement with a blade of a lawn mower.

Figure 4 is a sectional view taken on the line 4—4 of Figure 2.

This improved sharpener is particularly adapted for sharpening the blades 1 of a lawn mower, a portion of which has been shown in Figure 1 and attention is called to the fact that during a sharpening operation the lawn mower rests upon a table, bench or other support 2 in an inverted position with the roller 4 resting upon the table and the end of the lawn mower handle resting on the floor. The wheels 3 and the blades of the rotary cutter are out of contact with the table or support and, therefore, the cutter may have turning movement imparted to it during a sharpening operation.

The handle or operating bar 5 of this improved sharpener is formed from a strip of stiff metal such as iron or the like and adjacent one end thereof the strip is bent, as shown at 6, to provide a seat adapted to engage over the axle 7 of the lawn mower. Therefore, the axle of the lawn mower serves as a guide and by referring to Fig. 1, it will be seen that when the sharpener is in place, the actuating bar may be grasped adjacent its ends and slid along the axle longitudinally of the rotary cutter with a portion of the bar extending transversely of the cutter in overhanging relation thereto. A clamp 8, serving as a carrier for the file 9, extends transversely of the bar 5. This clamp is formed of strong metal such as steel and is preferably gradually reduced in width from one end toward the other, as shown in Figure 2, in order that it may conform to the shape of a flat file of conventional formation. Arms or fingers extend from opposite sides of the clamp at opposite ends thereof, the fingers at one end being indicated by the numerals 10 and 11 and those at the opposite end by the numerals 12 and 13, and attention is called to the fact that the arms 10 and 12 are bent to extend under the body portion of the clamp in spaced and substantially parallel relation thereto whereas the arms 11 and 13 are so bent that they extend under the body portion of the clamp at a downward inclination. Therefore, when the clamp is disposed upon the operating bar with its body portion over the bar and a set screw 14, carried by the clamp, is rotated in a direction to bear against the upper face of the bar and urge the clamp upwardly, the fingers or arms will be moved into gripping engagement with the under face and one side edge of the file, which extends transversely of the bar under the same and draw the file upwardly into tight binding engagement with the under face of the bar, Therefore, the file will be firmly but releasably held in a set position on the bar and can be adjusted longitudinally of the bar and also angularly adjusted so that it may extend either diagonally of the bar, as shown in Figure 2, or at right angles thereto. The lower free ends of the arms or fingers 11 and 13 are spaced from the free ends of the arms or fingers 10 and 12 transversely of the file and, when the device is in use, the ends of the arms 10 and 12 will bear against one side face of a blade. The free ends of the arms 11 and 13 will bear against the opposite side face of the blade. It will thus be seen that the blade will be disposed between the free ends of the arms with its upper edge face in contact with the under face of the file and as the actuating bar is slid longitudinally upon the axle 7 of the lawn mower, the arms will serve as guides for imparting turning movement to the cutter and a blade being sharpened will be progressively moved into proper engagement with the under face of the file.

When this improved sharpener is in use, the lawn mower is set upon a table or equivalent support in an inverted position, as shown in Fig. 1, with the roller resting upon the table and the handle of the lawn mower resting upon the floor, leaving the wheels 3 and the blades of the cutter bar out of contact with the table so that the cutter may turn freely. The bent portion or seat 6 of the actuating bar is engaged across the axle 7 and the set screw 14 loosened so that the clamp and file may be moved along the bar into position so that the file may rest upon the upper edge of a blade and the fingers engage opposite side faces of the blade. The set screw will then be tightened and the file will be firmly held to the cutting bar in proper spaced relation to the axle 7 and in such angular relation to the actuating bar that it extends parallel to the portion of the upper edge of the blade directly under the bar. The bar is then grasped adjacent its ends and pull exerted to slide the bar along the axle toward the operator. During this movement, the file has grasping engagement with the edge face of the blade to be sharpened and as the fingers engage opposite side faces of the blade, which is of spiral formation, turning movement will be imparted to the cutter and the file will move longitudinally upon the edge face of the blade. After the bar has been drawn forwardly toward the operator, the full length of the cutting blade, it is shifted rearwardly from the operator toward the opposite end of the blade and then again drawn forwardly. This reciprocating motion is continued but pressure is applied only during forward movement toward the operator as the file only sharpens when moving in one direction. It will be understood that if the operator finds it more convenient he can reverse the clamp and file and apply pressure during movement of the device away from the operator instead of toward him. After one blade has been sharpened it is only necessary to tilt the device upwardly about the axle or entirely remove the device from the lawn mower and turn the cutter to move an unsharpened blade into position for engagement by the file and fingers. When all the blades have been sharpened, the device will be removed and put away until again needed. It will thus be seen that the sharpener may not only accommodate itself to the size of the lawn mower but also the spiral of the blades.

What is claimed as new is:

1. A device of the character described comprising an operating bar adapted to be disposed transversely over a cutter and reciprocated longitudinally thereof, a clamp extending transversely of the bar over the same with end portions projecting from opposite sides of the bar, arms at opposite sides of the projecting end portions of said clamp, a sharpening element under the bar extending transversely thereof and disposed under the clamp longitudinally thereof, the arms at one side of the clamp being bent downwardly and inwardly to provide horizontal portions for engaging the under face of the sharpening element and the arms at the other side of the clamp being bent to extend inwardly at a downward inclination and bear against an edge face of the sharpening element at the opposite side thereof from the first arms, the free ends of opposed arms being spaced from each other transversely of the sharpening element to dispose the free ends in position to bear against opposite side faces of a blade having an edge to be sharpened in contact with the under face of the sharpening element, and a set screw threaded through an opening formed in the clamp intermediate the length thereof and adapted to engage the upper face of the bar and shift the clamp upwardly to move the arms into tight binding engagement with the sharpening element and securely but releasably holding the clamp and the sharpening element in a set position.

2. A device of the class described comprising an operating bar adapted to be disposed transversely of the rotary cutter of a lawn mower and reciprocated longitudinally thereof, a clamp consisting of a plate extending transversely across the upper face of said bar with its end portions projecting from opposite sides of the bar, the projecting end portions of the plate being provided with depending arms at opposite sides of the plate, a file extending longitudinally of said plate and bearing against the under face of the bar transversely thereof, said arms being bent downwardly and inwardly to engage said file, the arms at one side of the plate having their lower free ends spaced from the free ends of the arms at the other side of the plate whereby the ends of the arms may have contact with opposite side faces of a cutter blade for imparting rotation to the cutter as the file is moved along the upper edge of the blade during a sharpening operation, and a set screw carried by said plate in position for engaging the upper face of said bar to hold the clamp and file in an adjusted position longitudinally of the bar and in predetermined angular relation to the bar.

LEWIS P. ROODE.